Oct. 20, 1953    R. M. REDHEFFER    2,656,102
COMPUTING MACHINE
Filed April 18, 1946    4 Sheets-Sheet 1

INVENTOR
RAYMOND M. REDHEFFER
BY *M. A. Hayes*
ATTORNEY

Oct. 20, 1953 R. M. REDHEFFER 2,656,102
COMPUTING MACHINE
Filed April 18, 1946 4 Sheets-Sheet 3

INVENTOR
RAYMOND M. REDHEFFER
BY
*M. O. Hayes*
ATTORNEY

Patented Oct. 20, 1953

2,656,102

UNITED STATES PATENT OFFICE 2,656,102

COMPUTING MACHINE

Raymond M. Redheffer, Cambridge, Mass., assignor, by mesne assignments, to the United States of America as represented by the Secretary of the Navy Application April 18, 1946, Serial No. 662,983

15 Claims. (Cl. 235—61)

This invention relates in general to computing machines and in particular to machines for evaluating summations and integrals containing one or more parameters.

This invention is applicable in general for evaluating the summation of the products of two series of terms and in particular for evaluating the Fourier integral of a real or complex function, and for evaluating the power series.

In copending patent application Serial No. 659,711, filed April 5, 1946, of R. M. Redheffer now Patent No. 2,638,268, there is disclosed a computing machine which can be used for evaluating the convolution, the Laplace, and other integrals with variable limits and additional parameters. This system comprises, broadly, two pluralities of linear potentiometers electrically connected together in pairs in such a way that the voltage output from each pair is proportional to the product of the displacements of the sliding contacts on each potentiometer of the pair. The outputs from all the pairs are connected to a summing circuit which indicates a voltage proportional to the summation of the products of the displacements.

The principal object of this invention is to provide a computer which permits evaluation of complex mathematical functions.

A further object of this invention is to provide apparatus for evaluating the Fourier integral of a real or complex function, and for evaluating the power series.

Other and further objects of this invention will become apparent from the following specifications when taken with the accompanying drawings in which.

Figure 1:
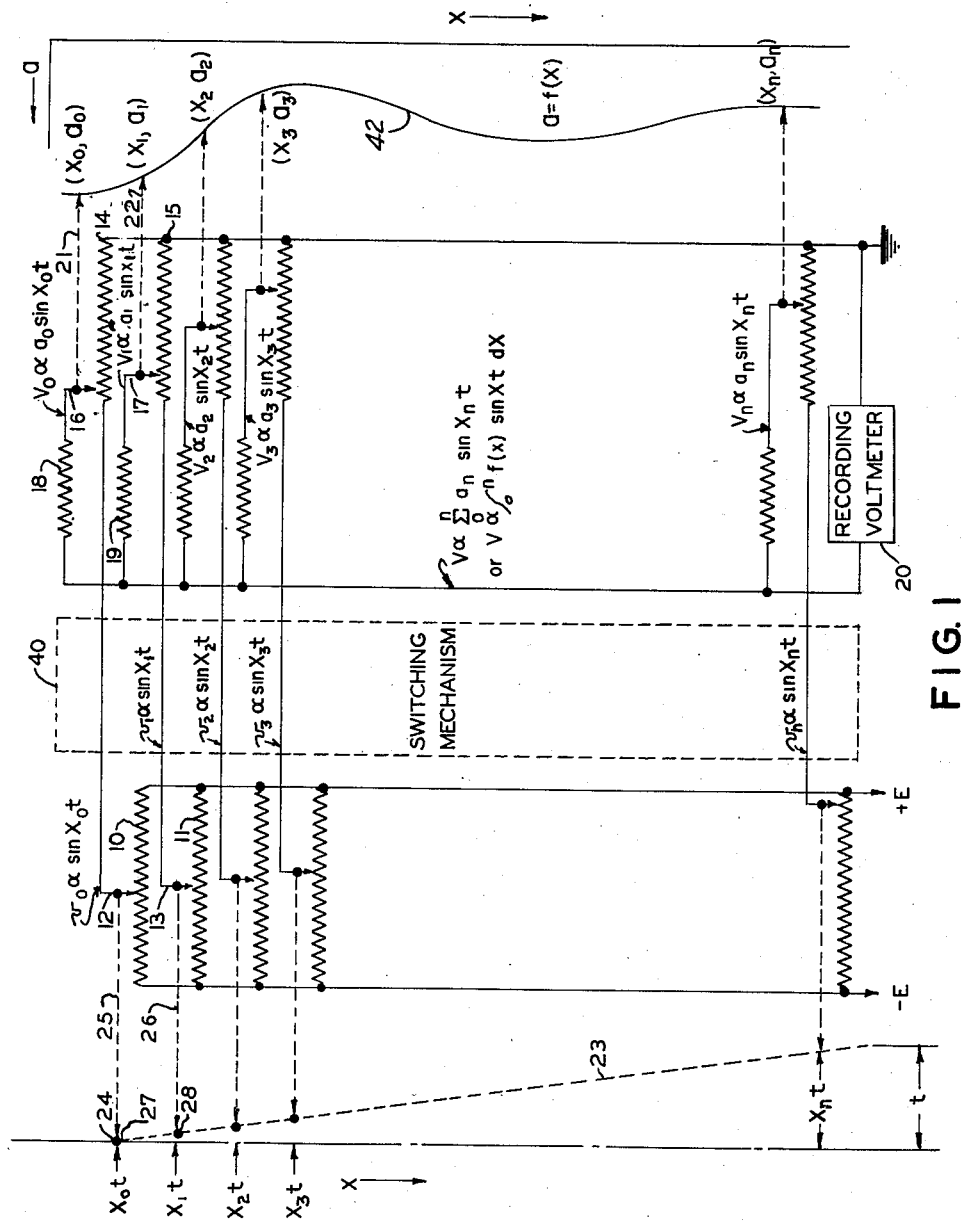
Fig. 1 is a schematic diagram of an embodiment of this invention.

Referring to the schematic diagram of the computer circuit, Fig. 1, a first plurality of potentiometers (10, 11, etc.) are so constructed that the voltage at the sliding contact (12, 13, etc.) of each potentiometer is proportional to the cosine of the distance from each contact to one end of the associated potentiometer. The corresponding ends of each of this plurality of potentiometers are connected one end to a negative voltage —E and the other end to an equal value positive voltage +E, as shown in Fig. 1, and the contacts of the potentiometers are normally positioned at the center of the resistance element where the voltage is zero and thus a displacement from the center position will result in a voltage proportional to the sine of the displacement. The contacts of the cosine potentiometers are each electrically connected to one end of each potentiometer of a second plurality of potentiometers (14, 15, etc.), which are linear potentiometers of the type described in the above named application. The contact arms (16, 17, etc.) of the plurality of linear potentiometers are connected to a plurality of fixed resistors (18, 19, etc.) which in turn are all connected to voltmeter 20, and the contact arms (16, 17, etc.) are mechanically connected to pointers (21, 22, etc.) which can be set according to the ordinates ($a_0$, $a_1$, etc.) of a curve of a function such as $a = f(x)$, curve 42. As explained in detail in the above named application the voltage on each contact arm of each linear potentiometer is proportional to the product of the two voltages produced, that is; $v_n a_n \sin x_n t$, where, $a_n$ is the ordinate of the $n$th term of the function $f(x)$ and $x_n t$ is the displacement of the contact arm of the $n$th potentiometer of the plurality of cosine potentiometers. Voltmeter 20 records a voltage proportional to the summation of the voltages, that is $$V \alpha \sum_0^n a_n \sin x_n t$$

or if the terms are taken sufficiently close together, the evaluation of the integral $$\int_0^n f(x) \sin xt\, dx$$

is recorded. This integral will be recognized as the Fourier integral of a real function.

Figure 2:
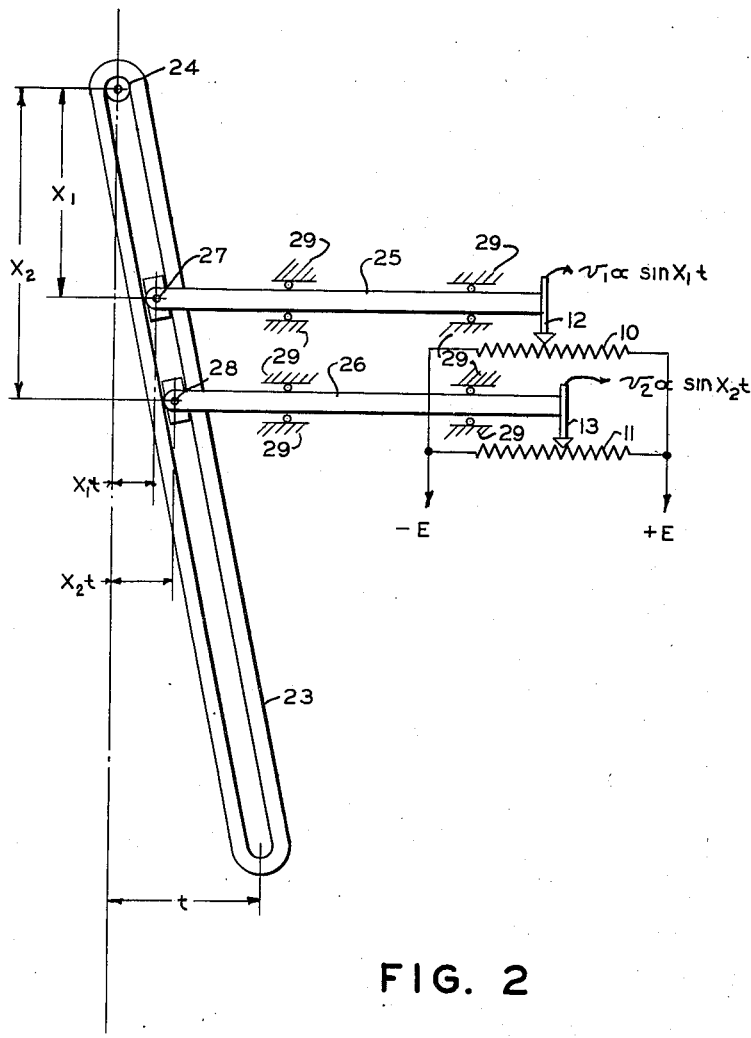
Fig. 2 is a diagram of a part of Fig. 1.

Fig. 2 shows the mechanical arrangement for displacing the contact arms of the cosine potentiometers a distance proportional to the parameter $t$, where $t$ is the measured horizontal displacement of the link and contact arm of the last potentiometer, not shown in the drawings. This potentiometer is taken to be located at a distance $x_1$ from pivot point 24 and determines the maximum possible limit of integration. As shown, lever 23 is free to rotate a limited amount around pivot 24. Contact arms 12, 13, etc. of cosine potentiometers 10, 11, etc. are mechanically connected by links 25, 26, etc. to sliding pivots 27, 28, etc. which are fitted in an axial groove in lever 23. Links 25, 26, etc. are limited to movement in one direction by constraining means 29 which can be rollers or grooves or any suitable means that will permit the links to slide without other motion. It is readily seen that when the end of lever 23 is displaced from its vertical position, the link and contact arm of the last potentiometer are displaced an amount equal to the parameter $t$. Simultaneously each link connected to the other potentiometers will move an amount proportional to the displacement $t$, the movement being proportional by the distance $x$ from pivot 24 to the connecting link. Since $x_1$ by construction represents the maximum possible value of $x$ as determined by the last potentiometer, it follows that $x_1$, $x_2$, $x_3$, etc., are fractional values of $x_1$ and differ from each other by predetermined increments. These values of $x$, including the value $x_n$ representing the maximum limit of $x$ for which the integral is to be evaluated as determined by the location of the $n$th potentiometer employed out of the maximum number of potentiometers, are all constants. Therefore, applying the theory of similar triangles to the first position $t_1$ of Fig. 2 it follows that $$t_1/t = x_1/x_1$$

Solving for $t_1$ $$t_1 = x_1 t/x_1$$

Since $x_1$ represents the maximum possible value for $x$, and since $x_1$ by construction is taken to be a fraction of $x_1$, it follows that $x_1$ with respect to $x_1$ is equal to unity or 1. Therefore, substituting 1 for $x_1$, it follows that $$t_1 = x_1 t$$

Recognizing that due to the construction of the potentiometer a displacement of the contact arm from the center position will result in a voltage proportional to the sin of the displacement, it follows that the voltage resulting from displacement of link 25, for example, is proportional to the sin of displacement $t_1$ or its equivalent, sin $x_1 t$.

Again referring to Fig. 1 (for clarity corresponding parts of all the figures are identified by the same numbers), the curve $a = f(x)$ is drawn to such a scale that the distance from pivot 24 to each connecting link is equal to the plotted value of $x$ corresponding to the point set by the linear potentiometer associated with the particular link in question. The voltage corresponding to each ordinate $a$ of the function $f(x)$ will be multiplied by the voltage corresponding to sin $xt$, the $x$ of sin $xt$ being the same $x$ of $f(x)$ corresponding to $a$, and the resultant voltage recorded on voltmeter 20 will be proportional to $$\int_0^n$$

$f(x)$ sin $xt$ $dx$ where $n$ is the number of potentiometer elements used.

Switching mechanism 40 may be of any conventional design, but is preferably composed of a shaft on which is mounted a stationary disc locked in position and having closely spaced contacts disposed around half of its periphery. These contacts are separately connected to the arms of potentiometers 12, 13, etc. A similar disc is on the opposite end of the shaft and its contacts are connected separately to the second series of potentiometers 14, 15, etc. The second disc is rotatable on the shaft. A third similar disc is centrally, rotatably mounted on the shaft and has connecting contactors spaced similarly to the contacts of the first and second discs mounted around half of its periphery. Since on all three discs the contacts extend only around half of the periphery, the rotatable discs may be so positioned that all circuits are open. Further, the design is such that $n$, the limit of the integral being evaluated, may be any whole number between zero and the total number of switch elements. Any multiple pole switch of the indexing type which completes circuits additively may be used, however.

The integral may also be solved between the limits $$-\frac{n}{2} \text{ and } +\frac{n}{2}$$

by placing pivot 24 at the center of lever 23 and plotting the curve $a = f(x)$ so that the point corresponding to $x = 0$ will be associated with the pivot point of the lever.

Figure 3:
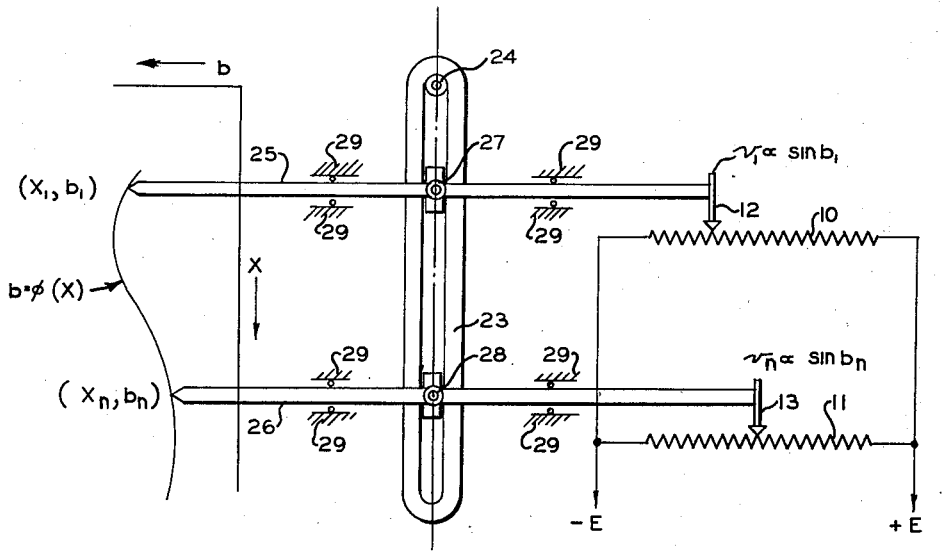
Fig. 3 and Fig. 4 show modifications of the apparatus of Fig. 2.
Figure 4:
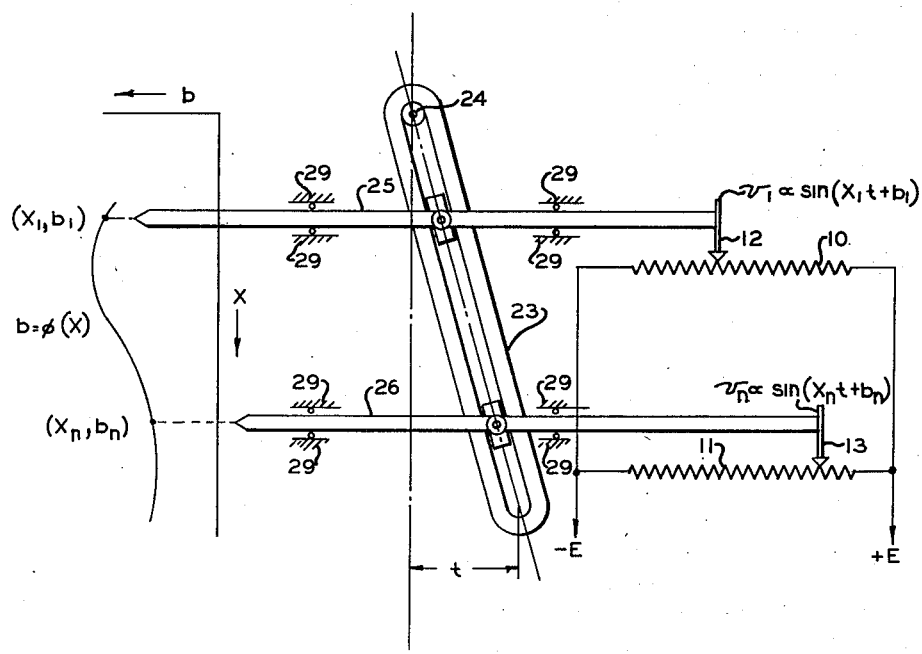

To evaluate the Fourier integral for complex functions of the form $$\int_0^n f(x) \sin [\phi(x) + xt] dx$$

means are added to introduce the function $\phi(x)$ in the sine term of the previous integral. This is accomplished by modifying the mechanism of Fig. 2 to obtain the mechanism of Fig. 3 and Fig. 4. Links 25, 26, etc. are extended through the sliding pivots (27, 28, etc.) of lever 23. With lever 23 in its normal position as shown in Fig. 3, the links are moved into positions corresponding to the ordinates $b$ of the curve $b = \phi(x)$ which curve is plotted to a corresponding scale of the plot of $a = f(x)$ to make the particular values of $a$ and $b$ correspond to the same value of $x$. This initial movement of the links positions the contact arms (12, 13, etc.) of the cosine potentiometers (10, 11, etc.) to cause the voltage on each arm to be proportional to the sine of the displacement $b$, as shown in Fig. 3. When the free end of lever 23 is moved about pivot point 24 as shown in Fig. 4, the contact arm of the last potentiometer is displaced by an amount $t$, the total displacement of each contact arm of each cosine potentiometer becomes equal to $b + xt$. Going through the circuits as explained previously it is apparent that the voltmeter will record a voltage proportional to the integral $$\int_0^n f(x) \sin [\phi(x) + xt] dx$$

Means (not shown) are provided to move lever 23 parallel to itself (after $t$ has been set) to obtain a maximum indication of resultant voltage on meter 20. When this is done, the indicated voltage is proportional to the absolute value of the Fourier exponential integral, that is $$V \alpha \left| \int_0^n f(x) e^{i[xt + \phi(x)]} dx \right|$$

where $e$ is the base of the Naperian log system and $i$ is equal to $$\sqrt{-1}$$

More extensive modifications are necessary to evaluate the power series of the form $$\sum_0^k a_k x^k$$

Figure 5:
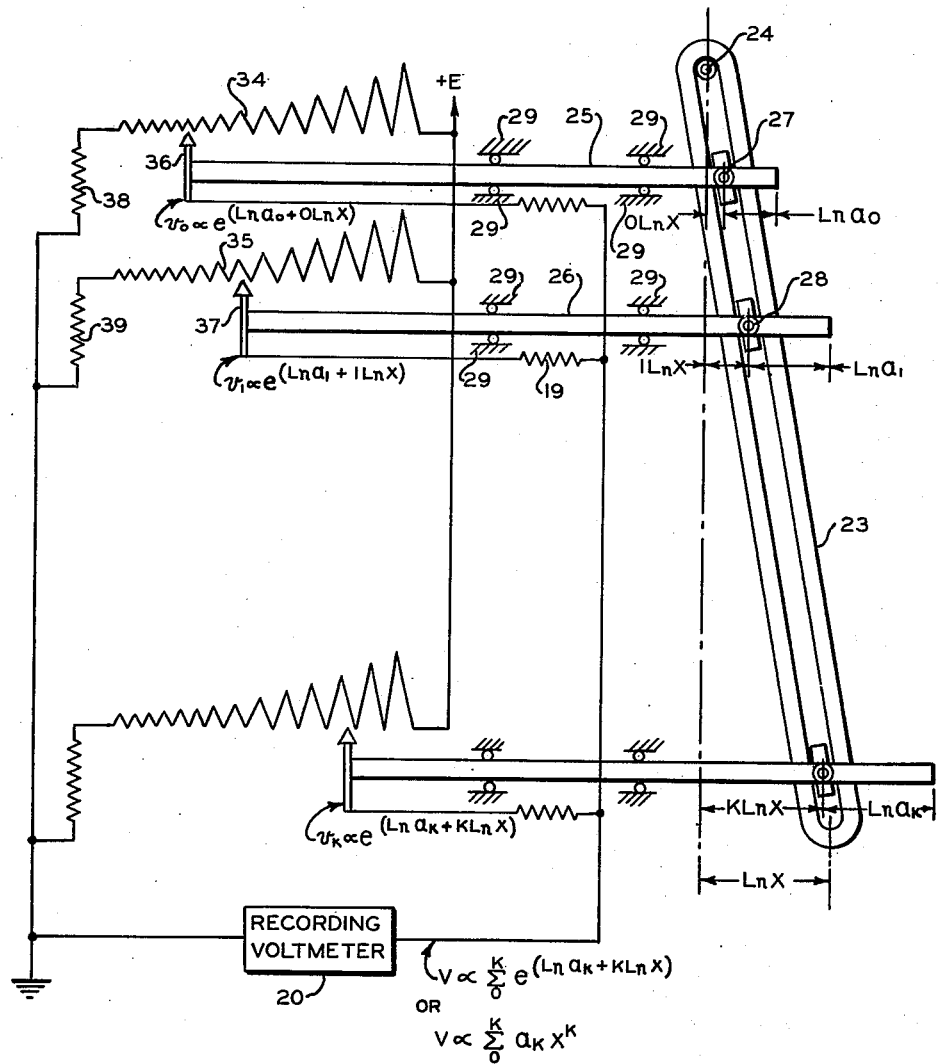
Fig. 5 is a schematic diagram of another embodiment of this invention.

Referring to Fig. 5, only one plurality of potentiometers are used and these potentiometers (34, 35, etc.) are of the so called exponential type, that is, the resistance variation between one end of the contact arm (36, 27, etc.) varies according to the relation $R=e^s$, where R is the value of resistance, $e$ is the base of the Naperian logarithm system, and $s$ is the distance the sliding contact is moved. The rest of the circuit is the same as that given in Fig. 1, except the potentiometers that inserted the ordinates $a_n$ of $f(x)$ are not used and fixed resistors 38, 39, etc. (Fig. 7) are inserted in series with each exponential potentiometer to make the voltmeter indicate one volt when $s=0$, that is, when $s=0$, $e^0=1$. Referring again to Fig. 7, when lever 23 is in its neutral position, the potentiometer setting bars (25, 26, etc.) are each moved a distance corresponding to the Naperian logarithm of one of the constants in the power series; that is, bar 25 is moved a distance proportional to L$n$ $a_0$, bar 26 is moved a distance proportional to L$n$ $a_1$, etc. The free end of lever 23 is then moved a distance proportional to L$n$ $x$ and it is apparent from the previous explanations that the total distance any one bar moves is L$n$ $a_k + k$ L$n$ $x$, where $k$ is the distance from the pivot 24 to the $k$th bar ($k$ also equals the number of the term in the series): It is now apparent that the voltage recorded by voltmeter 20 will be proportional to $$\sum_0^k e^{(Lna_k + kLnx)}$$

or as more commonly expressed, $$\sum_0^k a_k x^k.$$

This invention is not to be limited to the details of this specification, as the examples given are representative of only a few of the complex functions which may be evaluated by use of this apparatus. This invention is to be limited only by the following claims.

What is claimed is:

1. Apparatus for evaluating the summation of the products of a plurality of terms comprising, a source of potential, a plurality of potentiometers energized from said source of potential, the voltage on the movable contact of each of said potentiometers being proportional to the cosine of the displacement of said movable contact from an end of said potentiometer, a second plurality of potentiometers, the voltage on the movable contact of each of said second plurality of potentiometers being proportional to the displacement of said movable contact from an end of said potentiometer, each of said first plurality of potentiometers being connected to a corresponding potentiometer of said second plurality of potentiometers, whereby the voltage on the movable contact of each of said potentiometers of said second plurality is proportional to the product of the sine of said displacement of said first potentiometer and the displacement of said second potentiometer, said movable contacts of said second plurality of potentiometers being connected together through equal value isolating resistors, thereby providing a resultant voltage proportional to the sum of the voltages on said movable contacts of said second plurality, and means for indicating said resultant voltage.

2. The combination of claim 1 including, a switching mechanism connecting said two pluralities of potentiometers, said switching mechanism being operative to select a number of said product voltages, thereby providing the summation of said products between variable limits.

3. The combination of claim 1 including means for adjusting said movable contacts of each potentiometer of said two pluralities of potentiometers proportional to the variations in the ordinates of the curves of two functions, said first plurality of potentiometers being adjusted to the ordinates of one function and said second plurality to the ordinates of the other function, means for further displacing said movable contacts of said first plurality of potentiometers proportional to a parameter $t$ of said curves, said resultant voltage indicating the evaluation of the integral of the form $$\int_0^n f(x) \sin [\phi(x) + xt] dx$$

and a switching mechanism connecting said two pluralities of potentiometers, said switching mechanism being operative to select any number of terms of said functions to evaluate said integral between variable limits.

4. Apparatus for evaluating the summation of the terms of a power series comprising, a source of potential, a plurality of potentiometers energized from said source of potential and constructed so that the voltage on the movable contact of each of said potentiometers is proportional to the exponential of a base number raised to the power represented by the displacement of said movable contact from an end of said potentiometer, means for displacing said movable contacts proportional to the sum of the logarithms of the components of each of said terms of said power series to said base number, and means for indicating the summation of all said voltages so produced.

5. Apparatus for evaluating the summation of the products of a plurality of terms comprising in combination, a plurality of devices for providing an output voltage proportional to the product of a linearly varying voltage and a voltage varying as a sine function, means coupled to said devices for isolating the output voltage of each of said devices from the output voltages of all others of said devices, means coupled to said output voltage isolating means for providing a resultant voltage proportional to the sum of said output voltages, and means for indicating said resultant voltage.

6. Apparatus for evaluating the summation of the products of two series of terms graphically represented by suitable curves comprising, a source of potential, a first plurality of potentiometers energized from said source of potential and having the movable contact thereof displaced in conformity with the configuration of one of said curves, the voltage on the movable contact of each of said first plurality of potentiometers being proportional to the cosine of the displacement of said movable contact from an end of said potentiometer, a second plurality of potentiometers having the movable contacts thereof displaced in conformity with the configuration of a second of said curves, the voltage on the movable contact of each of said second plurality of potentiometers being proportional to the displacement of said movable contact from an end of said potentiometer, the movable contact of each of said first plurality of potentiometers being connected to one end of a corresponding potentiometer of said second plurality of potentiometers, whereby the voltage on the movable contact of each of said potentiometers of said second plurality is proportional to the product of the sine of said displacement of said potentiometer of said first plurality and the displacement of said second potentiometer of said second plurality, said movable contacts of said second plurality of potentiometers being connected together through equal value isolating resistors and providing a resultant voltage proportional to the sum of the voltages on said movable contacts of said second plurality of potentiometers, and means for indicating said resultant voltage.

7. Apparatus for evaluating the summation of the products of a plurality of terms comprising, a source of potential, a first plurality of potentiometers each connected across said source of potential and each having a normally centered, movable tap, a lever arm pivoted about a fixed point at one end thereof, a plurality of pivots slidably attached to and movable longitudinally of said lever, a plurality of links each extending between one of said slidable pivots and a tap of one of said potentiometers whereby each of said taps may be displaced an amount proportional to the distance of its respective attached link from said fixed pivot point, the voltage on each of said movable taps being proportional to the cosine of the displacement of each tap from an end of its respective potentiometer, a second plurality of potentiometers each having one end connected to the tap of a corresponding potentiometer of said first plurality of potentiometers and the other end connected to a voltage reference point and each having a movable tap, the voltage on the movable tap of each of said second plurality of potentiometers being proportional to the product of the sine of the displacement of the movable tap of the potentiometer of said first plurality and the displacement of the tap of the potentiometer of said second plurality, an isolating network of resistors connecting all of the movable taps of the potentiometers of said second plurality and means for indicating the voltages so combined in said isolating network.

8. Apparatus as in claim 7 including a curve disposed adjacent said second plurality of potentiometers, means for displacing the movable tap of each of said second plurality of potentiometers in accordance with the ordinates of said curve taken at points determined by the location of said curve relative to said second plurality of potentiometers, and switching means for connecting any desired number of said first plurality of potentiometers to a like number of said second plurality of potentiometers.

9. Computer apparatus comprising, a lever arm pivoted about a fixed point substantially at one end thereof, a plurality of pivots slidably mounted and movable longitudinally of said lever arm, a plurality of potentiometers each having a movable tap, a source of potential for energizing said plurality of potentiometers, a link connecting each of said movable taps to one of said slidably mounted pivots, said links being rotatable about said pivots, a recording voltmeter, means for combining the voltages on each of said movable taps, and means for applying said voltages to said recording voltmeter.

10. Computer apparatus comprising, a fixed pivot, a lever arm pivoted about said fixed pivot substantially at one end thereof, said lever arm having a longitudinal slot formed therein, a plurality of rectangular members slidably disposed within said longitudinal slot, a like plurality of pivot members each carried by one of said rectangular members, a like plurality of links rotatably mounted on said pivot members, a like plurality of potentiometers having straight-line resistance elements, a source of potential connected across said potentiometers, said resistance elements being spaced apart and disposed at right angles to the normal position of said lever arm, a movable tap on each of said potentiometers, each tap being connected to one of said links and movable in response to movement of said links, an isolating resistor connected to each of said taps, said isolating resistors being connected together to combine the output voltages of said movable taps, and a recording voltmeter connected to said isolating resistors to indicate the resultant voltage appearing on all of said taps.

11. Apparatus for evaluating the summation of the products of a plurality of terms comprising, a source of potential, a first plurality of potentiometers each having a movable tap and each connected across said source of potential, the potential on the tap of each of said first plurality of potentiometers being proportional to the sine of the displacement of that tap from a reference position on the potentiometer with which it is associated, a lever pivotally mounted about a fixed pivot point, a plurality of links, each of said links being disposed in the plane of movement of said lever and substantially perpendicular to a normal position of said lever, each of said links being restricted to movement in a single line in the plane of movement of said lever, means coupling each of said links to said lever such that displacement of said lever from said normal position results in a displacement of each of said links by an amount dependent upon the spacing of the line of travel of that particular link from said fixed pivot point, means coupling each of said links to the tap of a corresponding one of said first plurality of potentiometers, the displacement of each of said taps being proportional to the displacement of its associated link, a second plurality of potentiometers each having a movable tap, one terminal of each of said second plurality of potentiometers being connected to a point of reference potential, means connecting a second terminal of selected ones of said second plurality of potentiometers to the movable taps of selected ones of said first plurality of potentiometers, means for displaying in rectilinear coordinates a curve to be evaluated, a plurality of pointers each positioned parallel to the axis of ordinates of said curve and spaced along the axis of abscissas of said curve, each of said pointers being restricted in movement to a direction parallel to said axis of ordinates, said movement permitting a point of reference on each of said pointers to be moved into register with said curve, means connecting each of said pointers to the tap on a corresponding one of said second plurality of potentiometers, each of said taps on said second plurality of potentiometers being moved by an amount proportional to the movement of the pointer with which it is associated, equal value isolating resistors connecting the movable taps of said second plurality of potentiometers together, thereby providing a resultant voltage proportional to the sum of the voltages on said movable taps of said second plurality of potentiometers, and means for indicating said resultant voltage.

12. Apparatus for evaluating the integral of the form $$\int f(x) \sin [\phi(x) + xt] \, dx$$

where $f(x)$ and $\phi(x)$ are in the form of curves plotted in rectilinear coordinates, said apparatus comprising, a source of potential, a first plurality of potentiometers each having a movable tap and each connected across said source of potential, the potential on the tap of each of said first plurality of potentiometers being proportional to the sine of the displacement of that tap from a reference position on the potentiometer with which it is associated, a lever pivotally mounted about a fixed pivot point, a plurality of links, each of said links being disposed in the plane of movement of said lever and substantially perpendicular to a normal position of said lever, each of said links being restricted to movement in a single line in the plane of movement of said lever, each of said links being provided with a point of reference, means for displaying said curve $\phi(x)$ with the axis of ordinates parallel to the lines of movement of said links, said movement of said links permitting a point of reference on each of said links to be moved into register with said curve $\phi(x)$, means coupling each of said links to said lever, said coupling being such that displacement of said lever from said normal position results in a displacement of each of said links by an amount proportional to the spacing of the line of travel of that particular link from said pivot point, means coupling each of said links to the tap of a corresponding one of said first plurality of potentiometers, the displacement of each of said taps being proportional to the displacement of its associated link, a second plurality of potentiometers each having a movable tap, one terminal of each of said second plurality of potentiometers being connected to a point of reference potential, means connecting a second terminal of selected ones of said second plurality of potentiometers to the movable taps of selected ones of said first plurality of potentiometers, means for displaying in rectilinear coordinates the curve $f(x)$, a plurality of pointers each positioned parallel to the axis of ordinates of said curve $f(x)$ and spaced along the axis of abscissas of said curve $f(x)$, each of said pointers being restricted in movement to a direction parallel to said axis of ordinates, said movement permitting a point of reference on each of said pointers to be moved into register with said curve $f(x)$, means connecting each of said pointers to the tap on a corresponding one of said second plurality of potentiometers, each of said taps on said second plurality of potentiometers being moved by an amount proportional to the movement of the pointer with which it is associated, equal value isolating resistors connecting the movable taps of said second plurality of potentiometers together, thereby providing a resultant voltage proportional to the sum of the voltage on said movable taps of said second plurality of potentiometers, and means for indicating said resultant voltage.

13. Apparatus as in claim 12 wherein said means coupling said links to said lever includes a plurality of pivot means slidably mounted on said lever, each of said pivot means being pivotally secured to a corresponding one of said links.

14. Apparatus for evaluating the integral of the form $$\int f(x) \sin [\phi(x) + xt] \, dx$$

where $f(x)$ and $\phi(x)$ are in the form of curves plotted in rectilinear coordinates, said apparatus comprising, a source of potential having one terminal positive and one terminal negative with respect to a reference potential, a first plurality of potentiometers, each having a movable tap and each connected between said two terminals of said source of potential, the potential on the tap of each of said first plurality of potentiometers being proportional to the sine of the displacement of that tap from a reference position on the potentiometer with which it is associated, said reference position being the point on said potentiometer having a potential equal to said reference potential, a lever pivotally mounted about a fixed pivot point, a plurality of links, each of said links being disposed parallel to the other of said links in the plane of movement of said lever and substantially perpendicular to a normal position of said lever, each of said links being restricted to movement in a single line in the plane of movement of said lever, means for displaying said curve $\phi(x)$ with the axis of ordinates parallel to the lines of movement of said links, each of said links being provided with a point of reference, said movement of said links permitting said point of reference of each of said links to be moved into register with said curve $\phi(x)$, releasable means pivotally coupling each of said links to said lever, said coupling being such that displacement of said lever from said normal position when said links are coupled to said lever results in a displacement of each of said links by an amount proportional to the spacing of the line of travel of that particular link from said pivot point, means coupling each of said links to the tap of a corresponding one of said first plurality of potentiometers, the displacement of each of said taps being proportional to the displacement of its associated link, each of said movable taps occupying said reference position when said points of reference of said links lie along a straight line parallel to the axis of abscissas of said curve $\phi(x)$, a second plurality of potentiometers each having a movable tap, one terminal of each of said second plurality of potentiometers being connected to a point of reference potential, means connecting a second terminal of selected ones of said second plurality of potentiometers to the movable taps of selected ones of said first plurality of potentiometers, means for displaying in rectilinear coordinates the curve $f(x)$, a plurality of pointers each positioned parallel to the axis of ordinates of said curve $f(x)$ and spaced along the axis of abscissas of said curve $f(x)$, each of said pointers being restricted in movement to a direction parallel to said axis of ordinates, each of said pointers being provided with a point of reference, said movement permitting a point of reference of each of said pointers to be moved into register with said curve $f(x)$, means connecting each of said pointers to the tap on a corresponding one of said second plurality of potentiometers, each of said taps on said second plurality of potentiometers being moved by an amount proportional to the movement of the pointer with which it is associated, equal value isolating resistors connecting the movable taps of said second plurality of potentiometers together, thereby providing a resultant voltage proportional to the sum of the voltages on said movable taps of said second plurality of potentiometers, and means for indicating said resultant voltage.

15. Apparatus as in claim 14 wherein said releasable means pivotally coupling each of said links to said lever comprises a plurality of pivot means slidably mounted on said lever, and means releasably securing each of said links to a corresponding one of said pivot means.

R. M. REDHEFFER.

References Cited in the file of this patent

UNITED STATES PATENTS

| Number | Name | Date |
|---|---|---|
| 2,114,330 | Borden | Apr. 19, 1938 |
| 2,258,859 | Mitelman | Oct. 14, 1941 |
| 2,366,968 | Kaufmann | Jan. 5, 1945 |
| 2,385,334 | Davey | Sept. 25, 1945 |
| 2,439,381 | Darlington | Apr. 3, 1948 |
| 2,458,829 | Bruce | Jan. 11, 1949 |
| 2,475,314 | Dehmel | July 5, 1949 |
| 2,557,070 | Berry | June 19, 1951 |

FOREIGN PATENTS

| Number | Country | Date |
|---|---|---|
| 313,738 | Italy | Jan. 4, 1934 |